United States Patent [19]

Stetka et al.

[11] 4,341,618

[45] Jul. 27, 1982

[54] PROCESS FOR THE LIQUEFACTION OF SOLID CARBONACEOUS MATERIALS WHEREIN NITROGEN IS SEPARATED FROM HYDROGEN VIA AMMONIA SYNTHESIS

[75] Inventors: Steven S. Stetka, Fleetwood, Pa.; Francisco N. Nazario, Parsippany, N.J.

[73] Assignee: Exxon Research & Engineering Co., Florham Park, N.J.

[21] Appl. No.: 154,349

[22] Filed: May 29, 1980

Related U.S. Application Data

[63] Continuation-in-part of Ser. No. 71,451, Aug. 31, 1979, abandoned.

[51] Int. Cl.$^3$ .......................... C10G 1/00; C01C 1/04; C01B 21/00; C01C 3/00
[52] U.S. Cl. ............................. 208/8 LE; 423/359; 423/235; 423/237; 423/239
[58] Field of Search ............. 208/8 LE; 423/359, 235, 423/237, 239

[56] References Cited

U.S. PATENT DOCUMENTS

| | | | |
|---|---|---|---|
| 2,328,828 | 9/1943 | Marschner | 423/235 X |
| 3,661,507 | 5/1972 | Breitbach et al. | 423/239 X |
| 3,743,699 | 7/1973 | Bogart | 423/359 |
| 4,148,866 | 4/1979 | Becker | 423/359 |
| 4,197,281 | 4/1980 | Muenger et al. | 423/359 |
| 4,217,112 | 8/1980 | Johanson | 208/8 LE X |
| 4,221,684 | 9/1980 | Stein et al. | 208/8 LE |
| 4,238,468 | 12/1980 | Bonacci et al. | 423/362 X |

Primary Examiner—Delbert E. Gantz
Assistant Examiner—William G. Wright
Attorney, Agent, or Firm—Wayne Hoover

[57] ABSTRACT

In a process for the liquefaction of solid carbonaceous materials wherein bottoms residues are upgraded with a process wherein air is employed, the improvement wherein nitrogen buildup in the system is avoided by ammonia synthesis. In a preferred embodiment hydrogen from other portions of the liquefaction process will be combined with hydrogen produced as a result of the bottoms upgrading to increase the $H_2:N_2$ ratio in the ammonia reactor.

10 Claims, 1 Drawing Figure

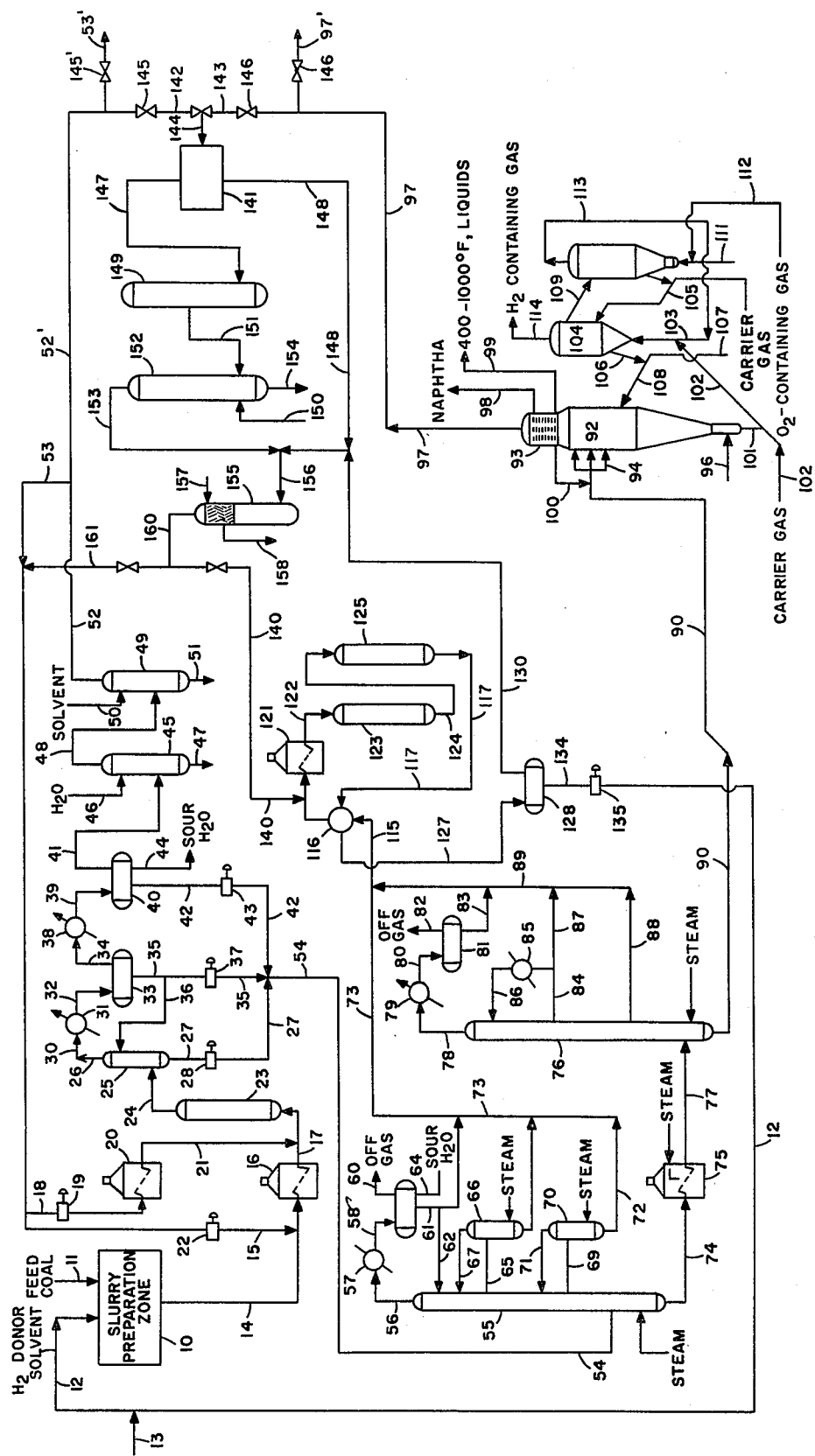

PROCESS FOR THE LIQUEFACTION OF SOLID CARBONACEOUS MATERIALS WHEREIN NITROGEN IS SEPARATED FROM HYDROGEN VIA AMMONIA SYNTHESIS

The Government of the United States of America has rights in this invention pursuant to Contract No. EF-77-A-01-2893 awarded by the U.S. Energy Research and Development Administration, now the U.S. Department of Energy.

CROSS REFERENCE TO RELATED APPLICATIONS

This application is a continuation-in-part of Serial No. 71,451, filed in the U.S. Patent and Trademark Office on Aug. 31, 1979 now abandoned.

BACKGROUND OF THE INVENTION

This invention relates to a process for the liquefaction of solid carbonaceous materials. More particularly, this invention relates to such a process wherein molecular nitrogen is separated from molecular hydrogen.

As is well known, coal has long been used as a fuel in many areas. For several reasons, such as handling problems, waste disposal problems, pollution problems and the like, coal has not been a particularly desirable fuel from the ultimate consumers point of view. As a result, oil and gas have enjoyed a dominant position from the standpoint of fuel sources throughout the world.

As is also well known, proven petroleum and gas reserves are shrinking throughout the world and the need for alternate sources of energy is becoming more and more apparent. One such alternate source is, of course, coal since coal is an abundant fossil fuel in many countries throughout the world. Before coal will be widely accepted as a fuel, however, it is believed necessary to convert the same to a form which will not suffer from the several disadvantages alluded to previously.

To this end, several processes wherein coal is either liquefied and/or gasified have been proposed heretofore. Of these, the processes wherein coal is liquefied appear to be more desirable in most cases since a broader range of products is produced and these products are more readily transported and stored. In such liquefaction processes, the coal is first slurried with a suitable solvent or diluent and then contacted with molecular hydrogen at an elevated temperature and pressure. Generally, the reaction product comprises a relatively high BTU gaseous product, a liquid product and a bottoms product. The bottoms will contain unconverted coal and inorganic mineral matter which was originally contained in the coal.

In the processes which have been proposed heretofore, molecular hydrogen may be produced by reforming the hydrocarbon portion of the gaseous product from the liquefaction step. Hydrogen may also be produced by gasifying the bottoms product either directly or by first coking the bottoms product and then gasifying the coke thus obtained. When coking is employed, a gas of relatively high BTU content can also be produced and this, too, may be reformed to produce molecular hydrogen. Generally, the hydrogen thus produced will be suitable to effect the liquefaction. In a closed system, however, and when air is used in the bottoms upgrading operation, nitrogen will build up in the hydrogen stream. In order to maintain hydrogen purity, and hence, maximum operating efficiency, it is, therefore, necessary to separate molecular nitrogen from the hydrogen to be used during liquefaction.

SUMMARY OF THE INVENTION

It has now been found that nitrogen build-up in the hydrogen produced either by reforming gaseous products or by gasifying coke or bottoms can be avoided by converting the nitrogen to ammonia and then separating the ammonia. Accordingly, it is an object of this invention to provide an improved process for the liquefaction of solid carbonaceous materials. It is still another object of this invention to provide such a process wherein "nitrogen build-up" in the molecular hydrogen produced directly or indirectly from liquefaction bottoms is avoided by forming ammonia therewith. These and other objects and advantages will become more apparent from the description set forth hereinafter and from the figure attached thereto.

In accordance with the present invention, the foregoing and other objects are accomplished by subjecting a solid carbonaceous material slurry to an elevated temperature and pressure to yield a gaseous product, a liquid product and a bottoms product. All or a portion of the bottoms product is then converted to more useful liquid and gaseous products in a treating step wherein air is employed and wherein the nitrogen is introduced into the system. The high BTU gaseous product from liquefaction and bottoms upgrading can be converted to hydrogen via reforming. The hydrogen produced via reforming of these gases or the $H_2$ recovered from the gases will contain nitrogen. Alternatively hydrogen can be obtained by directly gasifying a portion of the bottoms produced. If in the gasification air is used, then the resulting $H_2$ will also contain $N_2$. The amount of hydrogen available from these sources will be sufficient to enable the ammonia synthesis reaction to proceed at a lower temperature and pressure than is normally required to effect the reaction when stoichiometric concentrations of both $H_2$ and $N_2$ are present. As also indicated more fully hereinafter, either the high BTU gaseous streams used to produce the hydrogen or the hydrogen produced or recovered from these process gases or the hydrogen produced from bottoms gasification will be scrubbed to remove undesirable constituents.

BRIEF DESCRIPTION OF THE DRAWING

The drawing is a schematic flow diagram of a coal liquefaction process within the scope of the present invention.

DETAILED DESCRIPTION OF THE INVENTION

As indicated supra, the present invention relates to an improved process for the liquefaction of solid carbonaceous materials such a bituminous and subbituminous coals, lignite, coke and the like. The liquefaction is accomplished at an elevated temperature and pressure in the presence of molecular hydrogen and a hydrogen donor solvent. As also indicated supra, the liquefaction reactions generally result in the formation of a gaseous product, a liquid product and a bottoms product. After liquefaction, the gaseous product is, generally, separated from the liquid and bottoms products by flashing. The gaseous product comprises lower molecular weight hydrocarbons and unreacted $H_2$. This unreacted $H_2$ can and is recovered by cryogenically separating it from the hydrocarbons. All or a portion of these hydrocarbons may be reformed to produce hydrogen useful in the liquefaction reaction. Similarly, the bottoms will be separated from the liquid product and may be upgraded via coking and/or gasification. When the bottoms are subjected to coking, a gaseous product comprising lower molecular weight hydrocarbons and some $H_2$ will be produced. This gaseous product can be processed in a similar fashion as the liquefaction product to recover $H_2$. All or a portion of these lower molecular weight hydrocarbons may also be reformed to produce additional hydrogen which may then be used to effect the liquefaction reaction. As also indicated supra, the coke thus produced and/or the bottoms may be gasified to yield fuel or hydrogen which may also be useful in effecting the liquefaction reaction.

As is well known, when air is used to effect the gasification of the bottoms or the coke, nitrogen will be contained in the gaseous products and will "build up" when $H_2$ is recovered from products, when these products are reformed to produce hydrogen or when hydrogen is produced directly and then used to effect liquefaction. According to the present invention, build up is avoided by converting the nitrogen to ammonia and then separating the ammonia prior to feeding the hydrogen to the liquefaction reactor. Moreover, and when product hydrogenation is effected, nitrogen will also be removed from the hydrogen used to effect hydrogenation.

As indicated previously, the gaseous product from liquefaction may contain several constituents, particularly acid gases, which will adversely effect the ammonia synthesis reaction. It is, therefore, necessary to separate these constituents at some point prior to the ammonia synthesis. In general, any technique known in the prior art may be used to effect this separation and some separation may be effected prior to the liquefaction product gas being reformed, or it may first be reformed and the undesirable constituents then removed. Similarly, any acid gases that may be contained in the product resulting from coking and/or gasification may be removed immediately after the coking or gasification or, when reforming is employed, the separation may be effected after the reforming is accomplished. In either case, the resulting gaseous stream which is produced by upgrading of the bottoms is a process wherein when air is employed will, generally, comprise from about 33 to about 50 mole percent hydrogen and from about 50 to about 67 mole percent nitrogen. This, then, corresponds to a $H_2:N_2$ mole ratio within the range from about 0.5:1 to about 1:1.

In general, this $H_2:N_2$ ratio will be too low to permit the ammonia synthesis reaction to proceed quickly at temperatures and pressures available during the ammonia synthesis of this invention. This ratio can, however, be significantly increased by combining the stream produced by upgrading the bottoms with stream produced in liquefaction. Moreover, this ratio may be still further increased by reforming the gaseous product before the $NH_3$ synthesis and by passing recycle hydrogen through the ammonia synthesis reactor. In general, sufficient hydrogen will be added to yield an $H_2:N_2$ molar ratio of at least 75 and preferably enough will be added to yield an $H_2:N_2$ molar ratio within the range from about 90 to about 110.

Because of the relatively high $H_2:N_2$ molar ratio used in the ammonia synthesis step of this invention, ammonia synthesis may be accomplished at a temperature within the range from about 600° F. to 700° F. and at a pressure within the range from about 1500 to about 2500 psig. Both the temperature and pressure required are, then, well below that normally employed to effect an ammonia synthesis and since the hydrogen product is, generally, available at a temperature and pressure within these ranges in a liquefaction process, the present method is uniquely applicable to the removal of nitrogen from hydrogen produced during liquefaction or subsequently thereto.

In general, any of the catalysts known in the prior art to be effective in ammonia synthesis may be used in the method of the present invention. Oxides of iron are, of course, the most commonly used catalyst for this purpose and are, therefore, particularly preferred in the ammonia synthesis of this invention. In general, the hydrogen product gas will be contacted with the catalyst at a rate within the range from about 1 to about 2 W/hr/W.

After the ammonia synthesis is complete, the nitrogen may be separated from the product hydrogen, as ammonia, using any of the techniques known in the prior art to be effective therefor. Such techniques include scrubbing with acid solutions or water.

After the ammonia has been separated, the hydrogen may be fed to the liquefaction reactor. Moreover, when a part or all of the liquid product is subjected to further hydrogenation the hydrogen product stream may be divided and a portion used to effect the liquefaction and another portion used to effect the hydrogenation.

DESCRIPTION OF THE PREFERRED EMBODIMENTS

Having thus broadly described the invention, it is believed that the same will become even more apparent from the following description of a preferred embodiment by reference to the attached figure. Referring then to the figure, in a preferred embodiment, coal and a hydrogen-donor solvent are fed to a slurry preparation zone 10 through lines 11 and 12, respectively. As indicated more fully hereinafter, the hydrogen-donor solvent is derived from the coal liquefaction liquid product and the same is hydrogenated prior to recycle to the slurry preparation zone through line 12. The coal employed will normally consist of solid particles of bituminous coal, subbituminous coal, lignite or a mixture of two or more such materials having a particle size on the order of about ¼-inch or larger along the major dimension. It is generally preferred to crush and screen the feed coal to a particle size of about 8 mesh or smaller on the U.S. Sieve Series Scale and to dry the feed coal particles to remove excess water, either by conventional techniques before the solids are mixed with the solvent in the slurry preparation zone or by mixing the wet solids with hot solvent at a temperature above the boiling point of water, preferably between about 250° and 350° F. to vaporize any excess water present. The moisture in the feed slurry will preferably be reduced to less than about 2 weight percent. The hydrogen-donor solvent required for initial start-up of the process and make-up solvent that may be needed can be added to the system through line 13.

The process of the invention normally produces an excess of liquid hydrocarbons in the donor solvent boiling range and hence the addition of make-up solvent is generally unnecessary. In a preferred embodiment, solvent will, therefore, normally be fed through line 13 for start-up purposes only. The hydrogen-donor solvent employed to prepare the coal solvent slurry will normally be a coal-derived solvent, preferably a hydrogenated recycle solvent containing at least 20 weight percent of compounds which are recognized as hydrogen donors and boiling at the elevated temperatures of from 700° F. to about 900° F. which are generally employed in the coal liquefaction operations. Solvents containing at least 50 weight percent of such compounds are preferred. Representative compounds of this type include indane, $C_{10}$–$C_{12}$, tetrahydronaphthalenes, $C_{12}$ and $C_{13}$, acenaphthenes, di-, tetra-, and octahydroanthracene, tetrahydro, acenaphthenes, crycenes, phenanthrene, pyrene, and other derivatives of partially saturated aromatic compounds. Such solvents have been described in the literature and will be familiar to those skilled in the art. The solvent composition produced by the hydrogenation of hydrocarbons produced in the process will depend in part upon the particular coal used as the feedstock to the process, the process steps and operating conditions employed for liquefaction of the coal, the particular boiling range fraction selected for hydrogenation and the hydrogenation conditions employed within the hydrogenation zone. In the slurry preparation zone 10, the incoming feed coal is normally mixed with solvent recycle through line 12 in a solvent-to-coal ratio of from about 0.8:1 to about 10:1. Ratios of from about 1:1 to about 1.7:1 are, in most cases, preferred.

The slurry of coal and solvent which is prepared in zone 10 as described above is withdrawn through line 14 and introduced, together with hydrogen treat gas through line 15, into mixed phase preheat furnace 16 where the feed materials are heated to a temperature within the range between about 750° and about 950° F. The mixture of hot slurry and vapor withdrawn from the furnace through line 17 will ordinarily contain from about 1 to about 8 weight percent, preferably from about 2 to about 5 weight percent, of molecular hydrogen on a moisture and ash-free coal basis. In lieu of mixing the slurry and hydrogen treat gas prior to preheating in the furnace as described above, the hydrogen treat gas may be passed through line 18, containing valve 19, separately preheated in furnace 20 and thereafter passed through line 21 for addition to the hot slurry in line 17. It is particularly preferred, to mix the slurry and hydrogen prior to preheating in furnace 16. When the hydrogen is preheated separately, however, valve 19 will normally be open and valve 22 in line 15 will normally be closed.

The hot slurry containing hydrogen is fed from line 17 into liquefaction reactor 23 which is maintained at a temperature between about 750° and about 950° F., preferably between about 825° and 875° F. and at a pressure between about 1000 and about 3000 psig, preferably between about 1500 and 2500 psig. A single upflow liquefaction reactor is shown in the drawing but a plurality of reactors arranged in parallel or series can be employed if desired. The liquid residence time within reactor 23 will normally range between about five minutes and about 100 minutes and will preferably be from about 10 minutes to about sixty minutes. Within the liquefaction zone, high molecular weight constituents of the coal are broken down and hydrogenated to form lower molecular weight, gaseous, vapor and liquid products.

The effluent from liquefaction zone 23 is taken overhead through line 24. This effluent stream will normally include unreacted hydrogen, gaseous liquefaction products such as carbon dioxide, carbon monoxide, ammonia, hydrogen chloride, hydrogen sulfide, methane, ethane, ethylene, propane, propylene, naphtha and the like, solvent boiling range hydrocarbons and heavier liquefaction products including solid liquefaction residues. This stream is passed to reactor effluent separator 25 where it is separated at substantially liquefaction reactor pressure and at a temperature only slightly lower than that in the liquefaction reactor into a hot overhead vapor stream having a temperature of from about 700° F. to about 900° F. which is withdrawn through line 26 and a liquid stream taken off through line 27 containing pressure letdown valve 28. The hot overhead stream passes through line 30 and is subjected to further treatment such as cooling and scrubbing. Also, though not illustrated, a portion of the hot overhead vapor may be withdrawn as gaseous product.

In a most preferred embodiment, the entire hot overhead vapor stream will be withdrawn through line 30 and subjected to cooling and scrubbing. Also in this embodiment, as illustrated, the vapor stream passed through line 30 enters heat exchanger 31 where it is cooled to a temperature between about 400° F. and about 700° F., preferably between about 500° F. and about 600° F. and then passed through line 32 into hot separator 33, still at substantially liquefaction pressure. Gases and vapors are taken off overhead from the hot separator through line 34 and liquids are withdrawn through line 35. A portion of the liquid stream may be returned through line 35 to reactor effluent separator 25 for use as wash oil. The remaining liquid is then discharged through pressure letdown valve 37. When desired, the cooling may be accomplished in a plurality of heat exchangers. When this is done the gases and vapors in line 34 pass through a second heat exchanger 38 where they are further cooled without any substantial reduction in pressure. From the heat exchanger, the gases and vapors flow through line 39 into cold separator 40 where a further separation takes place. An overhead stream containing hydrogen, carbon monoxide, carbon dioxide, ammonia, hydrogen chloride, hydrogen sulfide, normally gaseous hydrocarbons and some naphtha boiling range hydrocarbon is withdrawn through line 41. A liquid stream containing dissolved gases but composed primarily of liquid hydrocarbons boiling below about 700° F. at atmospheric pressure is recovered through line 42 containing pressure letdown valve 43. A sour-water stream produced by the condensation of water vapor is withdrawn from separator 40 through line 44.

The gases and vapors recovered from the cold separator are passed from line 41 into the water scrubber 45 where they are contacted with water introduced through line 46 for the removal of ammonia, hydrogen chloride and other water-soluble constituents. Water containing the dissolved contaminants is withdrawn from the scrubber through line 47 and passed to cleanup facilities not shown in the drawing. The scrubbed gas and vapor is then passed through line 48 into solvent scrubber 49 where it is contacted with monoethanolamine, diethanolamine or a similar solvent introduced through line 40 for the removal of hydrogen sulfide, carbon dioxide and other gases. Spent solvent is withdrawn from this scrubber through line 51 and sent to a solvent recovery unit which does not appear in the drawing for the removal of the absorbed materials and regeneration of the solvent. The scrubber gases which contain lower molecular weight hydrocarbons, and hydrogen are taken overhead through line 52. A portion of the overhead gas may be withdrawn as recycle through line 53. All or a portion of the remaining gas may be withdrawn as product through line 53'. The gaseous product will be subjected to cryogenic separation to thereby recover hydrogen from the lower molecular weight hydrocarbons. All or a portion of these streams may, then, be withdrawn as product or further processed in accordance with the improved procedure of this invention.

In a preferred embodiment, the liquid stream withdrawn from liquefaction reactor effluent separator 25 through line 27 and the liquids recovered from the hot separator 33 and the cold separator 40 through lines 35 and 42 are combined following reduction of the pressure to about 100 psia or less and passed through line 54 to atmospheric fractionation unit 55. As indicated previously, essentially any means known in the prior art could be used to effect separation of the liquid and solid materials in this line. Fractionation is, however, preferred and when combined atmospheric and vacuum fractionation is employed, in atmospheric unit 55, the feed is fractionated and an overhead fraction composed primarily of gases and naphtha constituents boiling up to about 400° F. is withdrawn through line 56. This overhead fraction is cooled in exchanger 57 and passed through line 58 to the fractionator distillation drum 59 where the gases are taken off overhead through line 60. These gases may be employed as a fuel gas for the generation of process heat or used for other purposes and, indeed, may be combined with gases withdrawn from the liquefaction zone through line 52. The liquid hydrocarbons separated from the gas are withdrawn through line 61 and a portion of this stream is returned through line 62 to the upper part of the fractionating column. The remaining liquid may be passed through line 62 for use as feed to the solvent hydrogenation unit or taken off as a naphtha product boiling below the solvent boiling range. A sour-water stream is withdrawn from the distillate drum through line 64 and passed to water clean-up facilities not shown. One or more intermediate fractions boiling within the range between about 250° and about 700° F. are withdrawn from the atmospheric fractionator for use as feed to the solvent hydrogenation reactor. It is generally preferred to recover a relatively light fraction composed primarily of constituents boiling below about 500° F. by means of line 65, stripper 66, vapor return line 67 and line 68 and to recover a heavier intermediate fraction composed primarily of constituents boiling below about 700° F. by means of line 66, stripper 70, vapor return line 71 and line 72. These two intermediate distillate fractions plus naphtha recovered from the overhead stream are passed through line 73 for use as liquid feed to the solvent hydrogenation unit. A portion of one or both of these streams can also be withdrawn as product through a withdrawal line not shown in the drawing if desired. The bottoms fraction from the atmospheric column composed primarily of constituents boiling in excess of about 700° F. and including unreacted solids and residues, is withdrawn through line 74, is normally heated to a temperature of about 600° to about 775° F. in furnace 75, and is introduced into vacuum fractionation unit 76 through line 77. In some cases, the furnace can be omitted.

In the vacuum fraction column, the feed is distilled under reduced pressure to permit the recovery of an overhead fraction which is withdrawn through line 78, cooled in heat exchanger 79 and then passed through line 80 into distillate drum 81. Gases and vapors are taken off through line 82, passed to the vacuum equipment and then may be employed as fuel. Liquids are withdrawn through line 83. A heavier intermediate fraction, one composed primarily of constituents boiling below about 850° F., for example, may be recovered by means of line 87 from a pumparound circuit consisting of line 84, heat exchanger 85, line 86 and line 87. A still heavier side stream may be withdrawn through line 88, which may also include a pumparound. These three distillate fractions are passed through line 89 and combined with the distillate in line 73 for use as feed to the solvent hydrogenation unit. A part of one or all of these streams may also be taken off as product through a withdrawal line not shown in the drawing if desired. A bottoms fraction boiling in excess of about 1000° F. at atmospheric pressure and containing unreacted coal solids and residues is withdrawn from the vacuum fractionation column through line 90 and may be used for the production of additional liquid products and hydrogen as described hereinafter or upgraded in other ways.

There are a number of alternates to the fractionation step described above which may be employed if desired. One such alternate, for example, is to pass the liquid stream from the reactor effluent separator and liquefaction separator to a centrifuge, gravity settling unit, filter or the like for the removal of unreacted coal solids from the liquids prior to fractionation. Antisolvents such as hexane, decoline or certain petroleum hydrocarbon liquids may be added to the liquefaction products to facilitate separation of the unreacted coal and ash residues from the liquids and permit their removal from the system. Processes of this type have been described in the literature and will be familiar to those skilled in the art. The liquids remaining following the solids separation step can then be separated by fractionation into a naphtha fraction, one or more intermediate streams to be fed to the solvent hydrogenation reactor, and if desired, a heavier fraction which can be upgraded by hydrocracking and other downstream processing techniques.

In a preferred embodiment, the bottoms withdrawn through line 90 will be coked to produce a high BTU fuel gas, a liquid product and coke which will then be gasified to produce a hydrogen-containing gas or the bottoms will be gasified directly, such as by partial oxidation. In the embodiment illustrated, the hot liquefaction bottoms from the vacuum fractionator are passed through line 90 into fluidized bed coking unit 92. This unit will normally be provided with an upper scrubber and fractionation section 93 from which liquid and gaseous products produced as a result of the coking reaction can be withdrawn. The unit will generally also include one or more internal cyclone separators or similar devices not shown in the drawing which serve to remove entrained particles from the upflowing gases and vapors entering the scrubbing and fractionation sections and return them to the fluidized bed below. A plurality of feed lines 94 will ordinarily be provided as shown to obtain better distribution of the feed material within the coking zone. This zone contains a bed of fluidized coke particles which are maintained in the fluidized state by means of stream or other fluidizing gas introduced near the bottom of the unit through line 96. The fluidized bed is normally maintained at a temperature between about 1000° F. and about 1500° F. by means of hot char which is introduced into the upper part of the reaction section of the coker through line 108. The pressure within the reaction zone will generally range between about 10 and about 30 psig but higher pressures may be employed if desired. The optimum conditions in the reaction zone will depend in part upon the characteristics of the particular feed material employed and can be readily determined. The hot liquefaction bottoms fed into the fluidized bed of the coking unit is sprayed onto the surfaces of the coal particles in the bed. Here the material is rapidly heated to bed temperatures. As the temperature increases, lower boiling constituents are vaporized and the heavier portions undergo thermal cracking and other reactions to form lighter products and additional coke on the surface of the bed particles. Vaporized products, steam and entrained solids move upwardly through the fluidized bed and enter the cyclone separators or other devices where solids present in the fluids are rejected. The fluids then move into the scrubbing and fractionation section of the unit where refluxing takes place. An overhead gas stream which will contain nitrogen when air is used as a source of oxygen, is withdrawn from the coker through line 97. All or a portion of this gas stream may be withdrawn through line 97' as product and employed as a fuel or the like. Alternatively, however, and in a most preferred embodiment of the present invention all or a portion of this gas stream will be combined with all or a portion of the gas withdrawn from the liquefaction reactor through line 52 and used to produce hydrogen for use in the liquefaction and subsequent hydrogenation operations. A naphtha sidestream is withdrawn from the coker through line 98 and may be combined with naphtha produced at other stages in the process. A heavier liquids fraction having a normal boiling range between about 400 and 1000° F. is withdrawn as a sidestream through line 99 and may be combined with coal liquids produced elsewhere in the process. Heavy liquids boiling above about 1000° F. may be recycled through line 100 to the incoming feed stream.

The coke particles in the fluidized bed in the reaction section of the coker tend to increase in size as additional coke is deposited. These particles gradually move downward through the fluidized bed and are eventually discharged from the reaction section through line 101 as a dense-phase solid stream. This stream is picked up by steam or other carrier gas and transported upwardly through line 102 and line 103 into fluidized bed heater 104. Here the coke particles are heated to a temperature of from about 50° to about 300° F. above that in the reaction section of the coker by means of hot gases introduced through line 103. Hot solids are withdrawn from the bed of heater 104 through standpipe 106, picked up by steam or other carrier gas introduced through line 107 and returned to the reaction section of the coker through line 108. The circulation rate between the coker and the heater is thus maintained sufficiently high to provide the heat necessary to keep the coker at the required temperature. If desired, additional heat can be provided by the introduction of air into the heater through a line not shown in the drawing. When this is done, and as indicated previously, molecular nitrogen will be introduced into the coker, and hence, into the gas withdrawn through line 97.

Hot carbonaceous particles are continuously circulated from the fluid bed in heater 104 through line 109 to fluidized bed gasifier 110. Here the particles are contacted with the steam introduced into the lower end of the gasifier through line 111 and with an oxygen-containing gas injected through line 112. The oxygen reacts with the carbon in the solids to produce carbon oxides and generate heat. The steam reacts with the carbonaceous solids to produce a gas containing hydrogen, carbon monoxide, carbon dioxide and some methane. If desired, an alkali metal catalyst or an alkaline earth metal catalyst may be employed to catalyze the gasification reaction. The gas produced is taken overhead from the gasifier through line 113 and passed through line 103 to the heater 104 where heat is recovered and employed to raise the temperature of the coke particles circulated from the coking unit through line 102 and from the gasifier through line 105. A hydrogen-rich gas which will contain nitrogen when air is used as a source of oxygen, is withdrawn overhead through line 114 and may be passed over a water-gas shift catalyst to increase the ratio of hydrogen to carbon monoxide. Acid gases may then be removed and, while not illustrated in the figure, all or a portion of the hydrogen-containing gas may be passed through the ammonia synthesis reactor to remove any nitrogen that may be contained therein.

In a preferred embodiment, and as previously indicated, a hydrogen-donor solvent will be recovered from the liquid product, hydrogenated and recycled to the slurry preparation zone 10. In the embodiment illustrated, feed to the solvent hydrogenation stage includes liquid hydrocarbons composed primarily of constituents in the 250° F. to 700° F. boiling range recovered from atmospheric fractionator 55 and heavier hydrocarbons in the nominal 700° F. boiling range recovered from vacuum fractionator 76. It may also include hydrocarbons of similar boiling range characteristics recovered from associated coking unit 92. The hydrocarbon feed is passed through lines 73 and 89 into line 115 and heat exchanger 116. Here the feed material passes an indirect heat exchange with hot hydrogenated product withdrawn from the solvent hydrogenation reactor through line 117. The feed is preheated from an initial temperature of from about 100° F. to about 500° F. to a final temperature of from about 600° F. to about 750° F. at a pressure from about 800 to about 3000 psig. The preheated feed is withdrawn from the exchanger through 118 and combined with hydrogen introduced through line 140. When desired, the hydrogen introduced through line 140 may be preheated with heat exchange equipment which is not illustrated in the drawing. The combined stream is then passed through solvent hydrogenation reactor preheat furnace 121 and further heated to the temperature desired at the inlet to the solvent hydrogenation zone. The preheated mixture is then passed to the solvent hydrogenation zone through line 122.

In the embodiment illustrated, the solvent hydrogenation reactor is a two-stage downflow unit including an initial stage 123 connected by line 124 to a second stage 125 but other type reactors could be used if desired. The temperature, pressure, and space velocity employed in the hydrogenation zone will depend to some extent upon the character of the feed stream employed, the hydrogenation catalyst selected for the process and other factors. In general, temperatures within the range from about 550° F. and about 850° F., pressures between 800 psig and about 3000 psig and space velocities between about 0.3 and about 3 pounds of feed per hour per pound of catalyst are suitable. Hydrogen will be introduced through line 140 at a rate sufficient to maintain the average reactor hydrogen partial pressure between about 500 and about 2000 psia. It is generally preferred to maintain a mean hydrogenation temperature within the reactor between about 675° F. and about 750° F., a pressure between about 1500 and about 2500 psig, a liquid hourly space velocity between about 1 and about 2.5 pounds of feed/hour/pound of catalyst and a hydrogen feed rate sufficient to maintain an average reactor hydrogen partial pressure within the range between about 900 and about 1600 psia. Such hydrogenation techniques are, of course, well known in the prior art and form no part of the present invention.

The hydrogenated effluent produced in the solvent hydrogenation unit is withdrawn from the second stage 125 of the unit through line 117 at a temperature of from about 550° F. to about 850° F., preferably from about 700° F. to about 800° F., passed through heat exchanger 116 where it is cooled to a temperature on the order of from about 500° F. to about 700° F. and then passed through line 127 into solvent hydrogenation hot separator 128. An overhead gas stream is withdrawn from said separator at a temperature of from about 600° F. to about 700° F. through line 130 and is then, generally, combined with hydrogen fed to the ammonia synthesis unit to increase the $H_2:N_2$ molar ratio therein. As is known in the prior art, this stream will, generally, consist primarily of hydrogen. When hydrocarbons are present, however, the gas stream may, optionally, be combined with hydrogen-hydrocarbon mixtures fed to a cryogenic separator.

The solvent hydrogenation hot separator 128 will normally be operated at pressures between about 1500 and about 2500 psig. The liquids separated from the hydrogenated effluent in hot solvent hydrogenation separator 128 are withdrawn through line 134 containing pressure reduction valve 135. All or a portion of the liquid product may then be fed to the slurry preparation zone through line 12. Alternatively, the liquid product may be subjected to fractionation (not illustrated) to provide any desired solvent boiling range. Also, and while not illustrated, all or a portion of this liquid product may be withdrawn as liquid hydrocarbon products and used for fuel or other purposes. When this is done, a solvent from another source may, generally, be introduced through line 13.

As previously indicated, the product gas from the liquefaction reaction which is withdrawn through line 52' and the product gas withdrawn from the coker through line 97 will contain a mixture of light hydrocarbons and hydrogen. As also previously indicated, all or a portion of either of these streams may be withdrawn through lines 53' and 97', respectively, as product or all or a portion of both streams may be subjected to a cryogenic separation in cryogenic separator 141 to effect a separation between the hydrocarbons and the hydrogen. The gaseous product from the liquefaction reaction will be introduced into the cryogenic separator 141 through lines 142 and 144 while the product gas from the coker will be introduced into the cryogenic separator 141 through lines 143 and 144. In the embodiment illustrated, relative flows of these gas streams will be controlled by valves 145 and 145' and valves 146 and 146'.

In general, the cryogenic separator will be operated at a temperature within the range from about −200° to about −275° F. to effect a separation between the hydrocarbon and hydrogen contained in the gas. In the embodiment illustrated, the hydrocarbon portion of the gas will be withdrawn overhead through line 147 and the hydrogen will be withdrawn through line 148. The hydrocarbon portion of the gas may then be withdrawn as product (not illustrated) or subjected to steam reforming in steam reformer 149. In the embodiment illustrated, steam is introduced through line 150. In general, the reformer may be operated at any combination of conditions known in the prior art to be effective for the production of hydrogen and CO and the conditions actually selected are not critical to the present invention. Nonetheless, the reformer will, preferably, be operated at a temperature within the range from about 1500 to about 1600 and a pressure within the range from about 300 to about 350 psi. Steam will be provided at a rate suitable to yield from about 30 to about 75 moles of steam per mole of hydrocarbon in the reformer.

Product from the reformer is withdrawn through line 151 and passed through separator 152. In this separator, a gaseous stream comprising primarily hydrogen is separated from the carbon oxides produced during the reforming. The hydrogen stream is withdrawn through line 153 and the carbon oxides will be withdrawn through line 154. In general, any suitable means may be used to effect the separation in separator 152 and these include cryogenic separation, the use of acid gas sorbents and molecular sieves. The hydrogen-containing gas withdrawn through line 153 is then combined with hydrogen separated from the cryogenic separator 141 through line 148 and passed to ammonia synthesis unit 155 through line 156. As previously indicated, hydrogen from the hydrogenation zone which is separated through line 130 may be combined with this hydrogen as may the hydrogen-containing gas withdrawn from heater 104 through line 114. As also previously indicated, acid gases will, generally, be removed from these streams, when necessary, prior to introducing the same into the ammonia synthesis reactor 155. Similarly, acid gases will be removed from the coker product gas withdrawn through line 97 when required. Moreover, any one or all of these streams may be subjected to a methanation reaction to convert or remove carbon oxides that may be contained therein.

As previously indicated, the nitrogen contained in the hydrogen fed to the ammonia synthesis reactor through line 156 will react with hydrogen to form ammonia. The ammonia will then be separated in scrubbing section 157 and a high-purity hydrogen will be withdrawn from the ammonia synthesis reactor through line 160. Scrubbing solution will be introduced into the scrubber 157 through line 158 and spent solution may be withdrawn through line 159. In general, any suitable scrubbing solution may be employed in scrubber 157, however, aqueous acid solutions or water alone is most preferred.

In a most preferred embodiment, and as previously indicated, the hydrogen gas introduced into ammonia synthesis reactor 155 will contain from about 90 to about 110 moles of hydrogen per mole of nitrogen and the ammonia synthesis reactor will be operated at a temperature within the range from about 625° to about 675° F. and at a pressure within the range from about 1750 to about 2250 psia. The hydrogen withdrawn through line 160 may then be passed to the liquefaction section through line 161 and, when hydrogenation is employed, to the hydrogenation unit through line 140. Relative flow rates may be controlled with valves 162 and 163, respectively. Moreover, and while not illustrated, a part of the hydrogen could be withdrawn as product and used for other purposes.

Having thus described and illustrated the present invention, what is claimed is:

1. In a process for the liquefaction of solid carbonaceous materials wherein a solid carbonaceous material is slurried in a suitable solvent or diluent and contacted with molecular hydrogen at an elevated temperature and pressure to produce a gaseous product, a liquid product and a bottoms product and wherein at least a portion of the bottoms is upgraded in a processing step wherein air is employed to produce a gaseous stream comprising $H_2$ and $N_2$ in an $H_2:N_2$ ratio within the range from about 0.5:1 to about 1:1, the improvement wherein sufficient hydrogen is added to the gas comprising $H_2:N_2$ to yield a gas comprising $H_2$ and $N_2$ in an $H_2:N_2$ molar ratio of at least 75 and the molecular nitrogen is removed from the gas comprising $H_2$ and $N_2$ by ammonia synthesis.

2. The improvement of claim 1 wherein all or a portion of the gaseous product from liquefaction is subjected to reforming and hydrogen produced thereby is added to increase the $H_2:N_2$ molar ratio in the gas comprising $H_2$ and $N_2$.

3. The improvement of claim 1 wherein hydrogen produced by reforming all or a portion of the gaseous product from a coker is added to the gas comprising $H_2$ and $N_2$.

4. The improvement of claim 1 wherein the gaseous stream comprising $H_2$ and $N_2$ is produced by partial oxidation of the bottoms with air.

5. The improvement of claim 1 wherein a portion of the added hydrogen is obtained by cryogenic separation of the liquefaction or coking gaseous product.

6. In a process for the liquefaction of solid carbonaceous materials wherein a solid carbonaceous material is slurried in a suitable solvent or diluent and contacted with molecular hydrogen at an elevated temperature and pressure to produce a gaseous product, a liquid product and a bottoms product and wherein at least a portion of the gaseous product is steam reformed to produce hydrogen and at least a portion of the bottoms product is coked to produce a second gaseous product and a coke and wherein at least a portion of the coke is gasified to produce a gaseous product comprising $H_2$ and $N_2$ in an $H_2:N_2$ ratio within the range from about 0.5:1 to about 1:1, the improvement wherein sufficient hydrogen is added to the gaseous product comprising $H_2$ and $N_2$ to yield a gaseous mixture comprising $H_2$ and $N_2$ in an $H_2:N_2$ molar ratio of at least 75, at least a portion of the added hydrogen having been produced by reforming at least a portion of the gaseous product from liquefaction, and the molecular nitrogen is removed from the gaseous mixture comprising $H_2$ and $N_2$ by ammonia synthesis.

7. The improvement of claim 6 wherein the $H_2:N_2$ molar ratio in the gaseous mixture is within the range from about 90 to about 110.

8. The improvement of claim 7 wherein the ammonia synthesis is accomplished at a temperature within the range from about 600° F. to about 700° F. and at a pressure within the range from about 1500 psig to about 2500 psig.

9. The improvement of claim 7 wherein the ammonia synthesis is accomplished at a temperature within the range from about 625° F. to about 675° F. and at a pressure within the range from about 1750 to about 2250 psia.

10. The improvement of claim 7 wherein a portion of the added hydrogen is obtained by reforming the gaseous product from the coker.

* * * * *